(12) United States Patent
Ishikawa et al.

(10) Patent No.: US 9,696,195 B2
(45) Date of Patent: Jul. 4, 2017

(54) ULTRASONIC FLOW SWITCH

(71) Applicant: Keyence Corporation, Osaka (JP)

(72) Inventors: Kaname Ishikawa, Osaka (JP);
Tomoki Hanada, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/140,603

(22) Filed: Apr. 28, 2016

(65) Prior Publication Data

US 2016/0334254 A1 Nov. 17, 2016

(30) Foreign Application Priority Data

May 14, 2015 (JP) ................................. 2015-099222

(51) Int. Cl.
*G01F 1/66* (2006.01)
*G01F 15/18* (2006.01)
*G01F 15/14* (2006.01)

(52) U.S. Cl.
CPC ............. *G01F 15/18* (2013.01); *G01F 1/662* (2013.01); *G01F 1/667* (2013.01); *G01F 15/14* (2013.01)

(58) Field of Classification Search
CPC ....................................................... G01F 1/66
USPC ......................... 73/861.27–861.29
See application file for complete search history.

(56) References Cited

U.S. PATENT DOCUMENTS

| 4,083,286 A * | 4/1978 | Faulkner .................. G10H 7/00 84/647 |
| 7,093,502 B2 * | 8/2006 | Kupnik ................... G01F 1/662 73/861.27 |
| 7,775,125 B2 * | 8/2010 | Rhodes ..................... G01F 1/66 73/861.27 |
| 2015/0045806 A1 * | 2/2015 | Urich .................. A61F 9/00745 606/107 |
| 2016/0334251 A1 | 11/2016 | Otsu et al. |
| 2016/0334252 A1 * | 11/2016 | Kashima ................ G01F 1/662 |

FOREIGN PATENT DOCUMENTS

JP 2001-356032 A 12/2001

* cited by examiner

*Primary Examiner* — Jewel V Thompson
(74) *Attorney, Agent, or Firm* — Kilyk & Bowersox, P.L.L.C.

(57) ABSTRACT

Provided is an ultrasonic flow switch that can be used by simple setting operation. Input information regarding at least one of the pipe and the fluid is accepted, a flow rate of the fluid in the pipe is calculated, based on an output signal of at least one of the ultrasonic elements, and the accepted input information, and an on/off signal is outputted, based on the calculated flow rate and a flow rate threshold value decided beforehand. In a simple setting mode, only an outer diameter of the pipe, only a thickness of the pipe, or both the outer diameter and the thickness of the pipe is (are) accepted as the input information.

8 Claims, 7 Drawing Sheets

ULTRASONIC FLOW SWITCH

CROSS-REFERENCE TO RELATED APPLICATIONS

The present application claims foreign priority based on Japanese Patent Application No. 2015-099222, filed May 14, 2015, the contents of which is incorporated herein by reference.

BACKGROUND OF THE INVENTION

1. Field of the Invention

The invention relates to an ultrasonic flow switch.

2. Description of Related Art

There is an ultrasonic flowmeter that measures a flow rate of a fluid flow in pipe through the use of an ultrasonic wave. An ultrasonic flowmeter described in JP 2001-356032 A has a sensor part. The sensor part is attached to an outer surface of the pipe to transmit the ultrasonic wave to the fluid in the pipe from the sensor part. The ultrasonic wave propagated in the fluid is received by the sensor part. The flow rate of the fluid flow in the pipe is calculated, based on a time when the ultrasonic wave is propagated in the fluid.

In the above-described ultrasonic flowmeter, the time required from the transmission to the reception of the ultrasonic wave differs, depending on a dimension and a material of the pipe, a sonic speed in the fluid, a temperature, a density, and a kinetic viscosity of the fluid, and the like. Thus, for accurately calculating the flow rate of the fluid, various parameters regarding characteristics of the pipe and the fluid are required.

Accordingly, a user needs to perform complicated operation to set the various parameters, which imposes a large burden on the user. Moreover, it is difficult for a user having poor knowledge regarding such setting to properly make various settings.

On the other hand, as in a case where an operational state of a facility in a factory is managed, there is a case where an exact value of the flow rate of the fluid flow in the pipe is not required, but whether or not the fluid is flowing in the pipe at a flow rate equal to or larger than a predetermined value only needs to be detected. In such a case, in place of a flowmeter, a flow switch that outputs an on/off signal can be used. The flow switch is required to be usable by simple setting operation without requiring expert knowledge and complicated operation.

SUMMARY OF THE INVENTION

An object of the invention is to provide an ultrasonic flow switch usable by simple setting operation.

According to one embodiment of the invention, there is provided an ultrasonic flow switch that outputs an on/off signal based on a flow rate of a fluid flow in a pipe, the ultrasonic flow switch including a first ultrasonic element that performs at least transmission of the transmission of an ultrasonic wave to the fluid flow in the pipe, and reception of the ultrasonic wave from the fluid flow in the pipe, a second ultrasonic element that performs at least the reception of the transmission of the ultrasonic wave to the fluid flow in the pipe, and the reception of the ultrasonic wave from the fluid flow in the pipe, a fixture that detachably fixes the first and second ultrasonic elements to an outer surface of the pipe integrally or separately, a reception interface that accepts input information regarding at least one of the pipe and the fluid, a calculation part that calculates the flow rate of the fluid in the pipe, based on an output signal of at least one of the first and second ultrasonic elements, and the input information accepted by the reception interface, and an output part that outputs the on/off signal, based on the flow rate calculated by the calculation part, and a flow rate threshold value decided beforehand, wherein the reception interface accepts only an outer diameter of the pipe, only a thickness of the pipe, or both the outer diameter and the thickness of the pipe as the input information in a first setting mode.

In this ultrasonic flow switch, the first and second ultrasonic elements are fixed to the outer surface of the pipe by the fixture, and the transmission and the reception of the ultrasonic wave are performed through the fluid in the pipe between the first and second ultrasonic elements. The flow rate of the fluid in the pipe is calculated, based on the output signal of at least one of the first and second ultrasonic elements, and the input information accepted by the reception interface, and the on/off signal is outputted, based on the calculated flow rate and the flow rate threshold value decided beforehand.

In the first setting mode, only the outer diameter of the pipe, only the thickness of the pipe, or both the outer diameter and the thickness of the pipe is (are) accepted, so that other information regarding the pipe and the fluid is not requested to the user. Accordingly, the user can use the ultrasonic flow switch by simple setting operation with no expert knowledge and complicated operation required.

According to another embodiment of the invention, the reception interface may accept, as the input information, one condition selected by a user from a plurality of conditions decided beforehand as the outer diameter of the pipe, the thickness of the pipe, or the outer diameter and the thickness of the pipe in the first mode. In this case, the input information is set by the selection of the one condition by the user. Accordingly, the operation for setting the input information is easier.

According to still another embodiment of the invention, the reception interface may accept, as the input information, detailed information including a parameter regarding the pipe or the fluid other than the outer diameter and the thickness of the pipe in a second setting mode. In this case, in the second setting mode, more detailed setting regarding the pipe and the fluid can be made. This can increase the accuracy of the calculation of the flow rate, so that the ultrasonic flow switch can be used in diverse situations.

According to still another embodiment of the invention, the detailed information may include adjustment information for adjusting the flow rate calculated by the calculation part. In this case, an error in the calculation of the flow rate can be corrected, based on the adjustment information, as needed.

According to still another embodiment of the invention, the reception interface may sequentially accept a plurality of pieces of setting information corresponding to a plurality of setting items as the input information. In this case, since the plurality of pieces of setting information are sequentially accepted, the user need not perform the selection of the setting items and the like. Accordingly, operation for the various settings becomes easy.

According to still another embodiment of the invention, the reception interface may sequentially display a plurality of setting screens corresponding to the plurality of setting items to accept the setting information on the respective setting screens. In this case, the user can easily perform the operation for the various settings while viewing the displayed setting screens.

According to still another embodiment of the invention, the output part may include first and second output parts, the threshold value may include first and second threshold values, the first output part may output the on/off signal, based on the flow rate calculated by the calculation part and the first threshold value, and the second output part may output the on/off signal, based on the flow rate calculated by the calculation part and the second threshold value.

In this case, the on/off signal based on the first threshold value, and the on/off signal based on the second threshold value are outputted. Diverse controls of an external device are enabled, based on these on/off signals.

According to the invention, the ultrasonic flow switch can be used by simple setting operation.

DETAILED DESCRIPTION OF PREFERRED EMBODIMENTS

[1] Schematic Configuration of Ultrasonic Flow Switch

Figure 1:
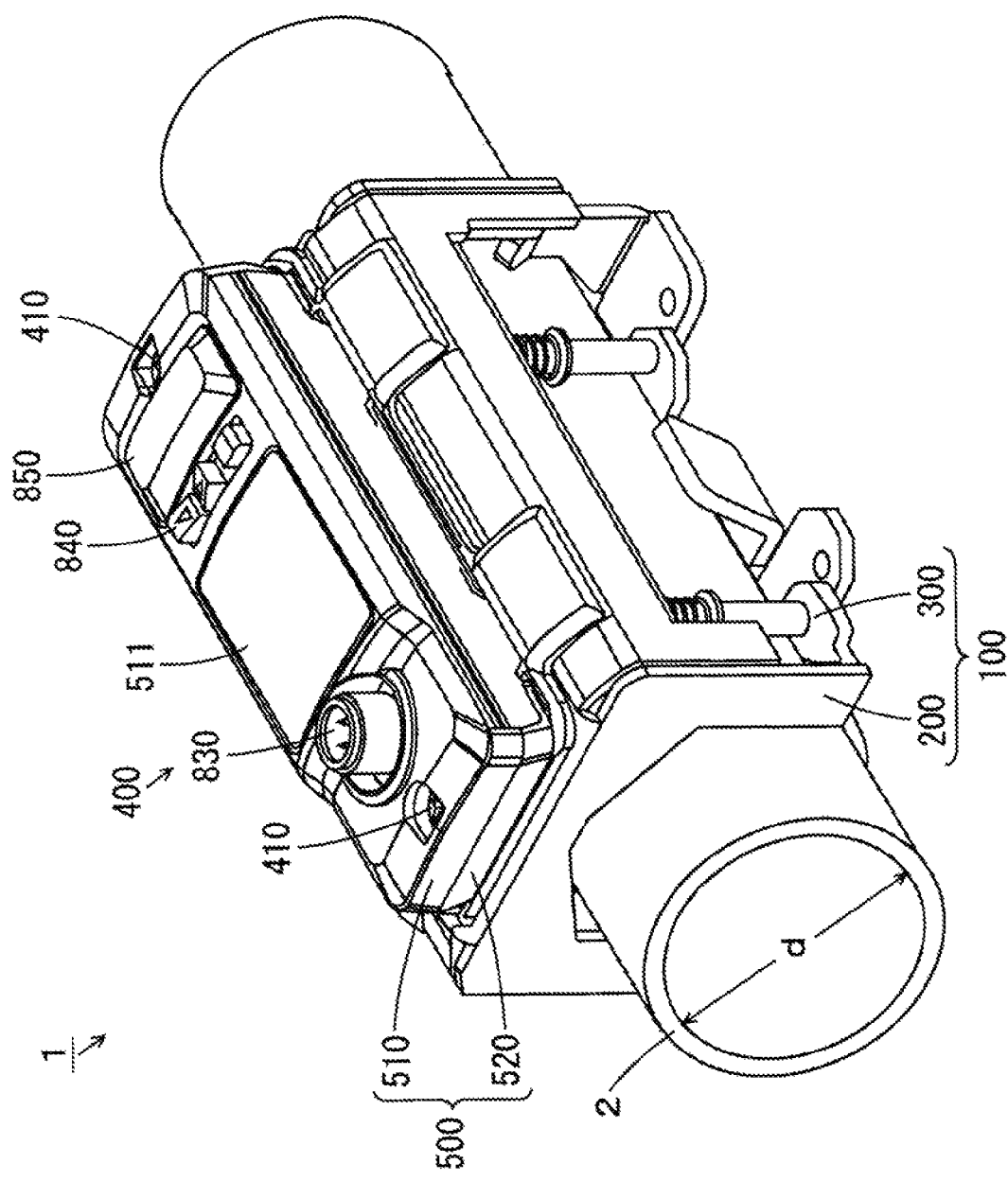
FIG. 1 is an external perspective view of a flow switch according to one embodiment of the invention.
Figure 2:
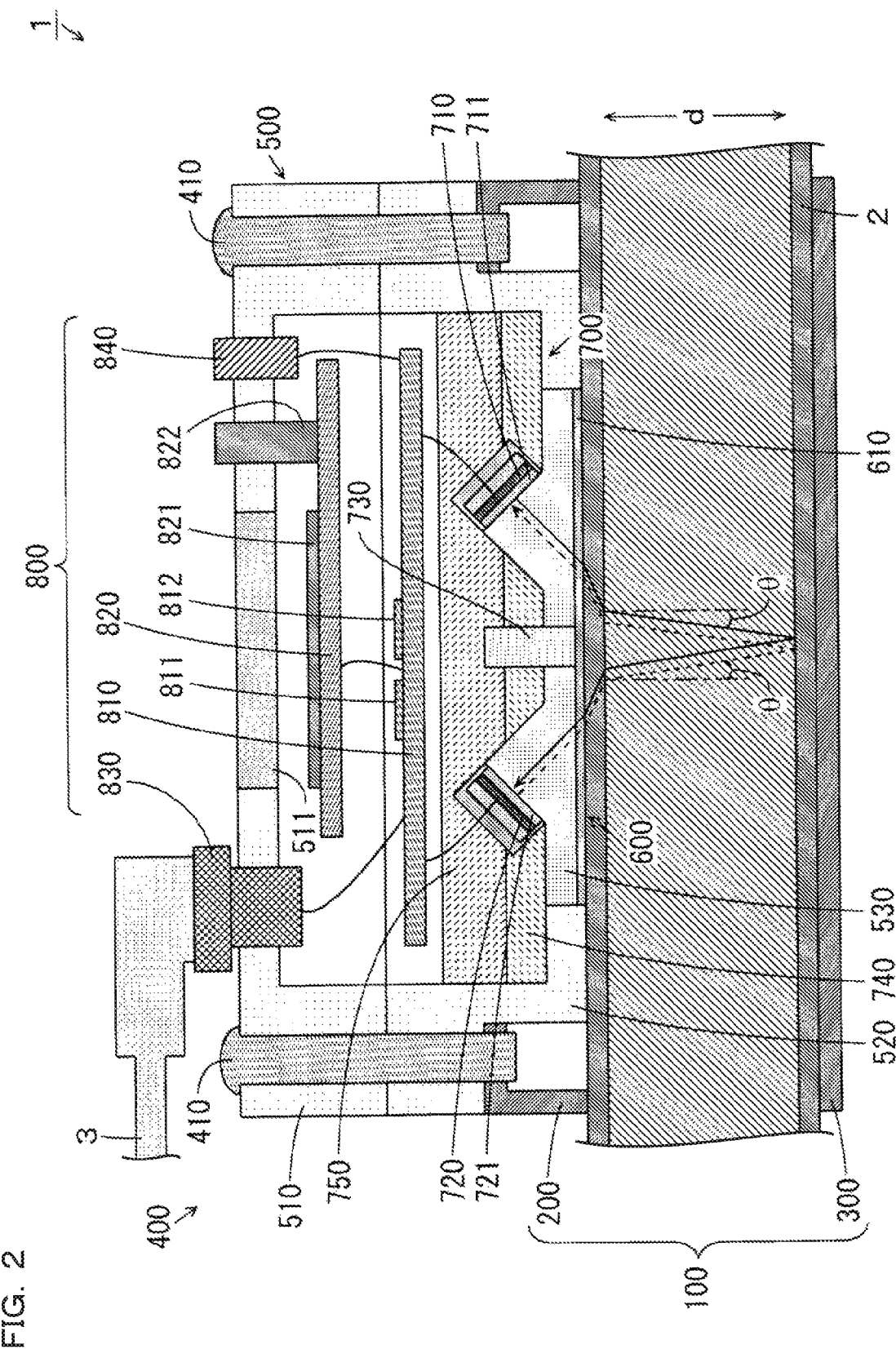
FIG. 2 is a schematic longitudinal section view showing an internal configuration of the flow switch in FIG. 1.

Hereinafter, an ultrasonic flow switch according to one embodiment of the invention (hereinafter, abbreviated to a flow switch) will be described with reference to the drawings. FIG. 1 is an external perspective view of a flow switch according to the one embodiment of the invention. FIG. 2 is a schematic longitudinal section view showing an internal configuration of the flow switch 1 in FIG. 1. As shown in FIG. 1, the flow switch 1 includes a clamp part 100 and a sensor part 400.

The clamp part 100 includes an upper clamp member 200 and a lower clamp member 300. The upper clamp member 200 and the lower clamp member 300 are disposed so as to sandwich pipe 2. In this state, the clamp part 100 is attached to an outer circumferential surface of the pipe 2. In an example of FIG. 1 and FIG. 2, an inner diameter of the pipe 2 is d. In the present embodiment, the sensor part 400 is detachably fixed to the upper clamp member 200 by two sensor fixing screws 410.

As shown in FIG. 2, the sensor part 400 includes a housing part 500, a coupling part 600, an ultrasonic control mechanism 700, and an electronic circuit part 800. The housing part 500 includes an upper housing part 510, a lower housing part 520, and a channel member 530. The upper housing part 510 has a window part 511 formed of a transparent member in an upper surface. The upper housing part 510 is attached to an upper portion of the lower housing part 520, and the channel member 530 is attached to a lower portion of the lower housing part 520. With this configuration, the housing part 500 has therein a space in which a liquid such as water, oil, and the like cannot enter.

The coupling part 600 includes a solid acoustic couplant 610. The acoustic couplant 610 is held by a holding member not shown with respect to the lower housing part 520 so as to be located between the channel member 530 of the housing part 500 and the pipe 2.

The ultrasonic control mechanism 700 is contained in the housing part 500. The ultrasonic control mechanism 700 includes two ultrasonic elements 710, 720, an ultrasonic shielding plate 730, and two filling members 740, 750. The ultrasonic element 710 is disposed so as to form a predetermined angle to the pipe 2, and is joined to the channel member 530 through an acoustic joining material 711. Similarly, the ultrasonic element 720 is disposed so as to form a predetermined angle to the pipe 2, and is joined to the channel member 530 through an acoustic joining material 721.

The ultrasonic shielding plate 730 is provided so as to divide the channel member 530 between the ultrasonic elements 710, 720. The filling members 740, 750 are formed of members different from each other. The filling member 740 is disposed so as to surround circumferences of the ultrasonic elements 710, 720. The filling member 750 is disposed above the filling member 740.

The electronic circuit part 800 includes a main substrate 810, a subordinate substrate 820, a connector 830, and an indicating lamp 840. The main substrate 810 is electrically connected to the ultrasonic elements 710, 720, the subordinate substrate 820, the connector 830, and the indicating lamp 840. In the main substrate 810, a control part 811 and a storage part 812 are mainly provided.

The control part 811 includes, for example, a CPU (Central Processing Unit). The control part 811 is connected to an external device of the flow switch 1 through the connector 830 and a cable 3. This allows the main substrate 810 and the subordinate substrate 820 to be powered from a power supply of the external device. The external device is, for example, a personal computer or a programmable logic controller. The storage part 812 includes a recording medium such as a nonvolatile memory, a hard disk, and the like. In the storage part 812, various types of data and programs for operating the flow switch 1 are stored.

In the subordinate substrate 820, a display part 821 and an operation part 822 are mainly provided. The main substrate 810 and the subordinate substrate 820 are contained in the housing part 500. The display part 821 includes a 14-segment LED (Light Emitting Diode) panel. The display part 821 may include any of a 7-segment LED panel, a liquid crystal display, and a dot matrix display in place of the 14-segment LED panel. The operation part 822 includes a plurality of buttons, and is configured operably from above the housing part 500. Details of the plurality of buttons will be described later. The connector 830 includes one or a plurality of input/output terminals. The indicating lamp 840 includes one or a plurality of LEDs. The connector 830 and the indicating lamp 840 are provided on an upper surface of the upper housing part 510 of the housing part 500.

Figure 3:
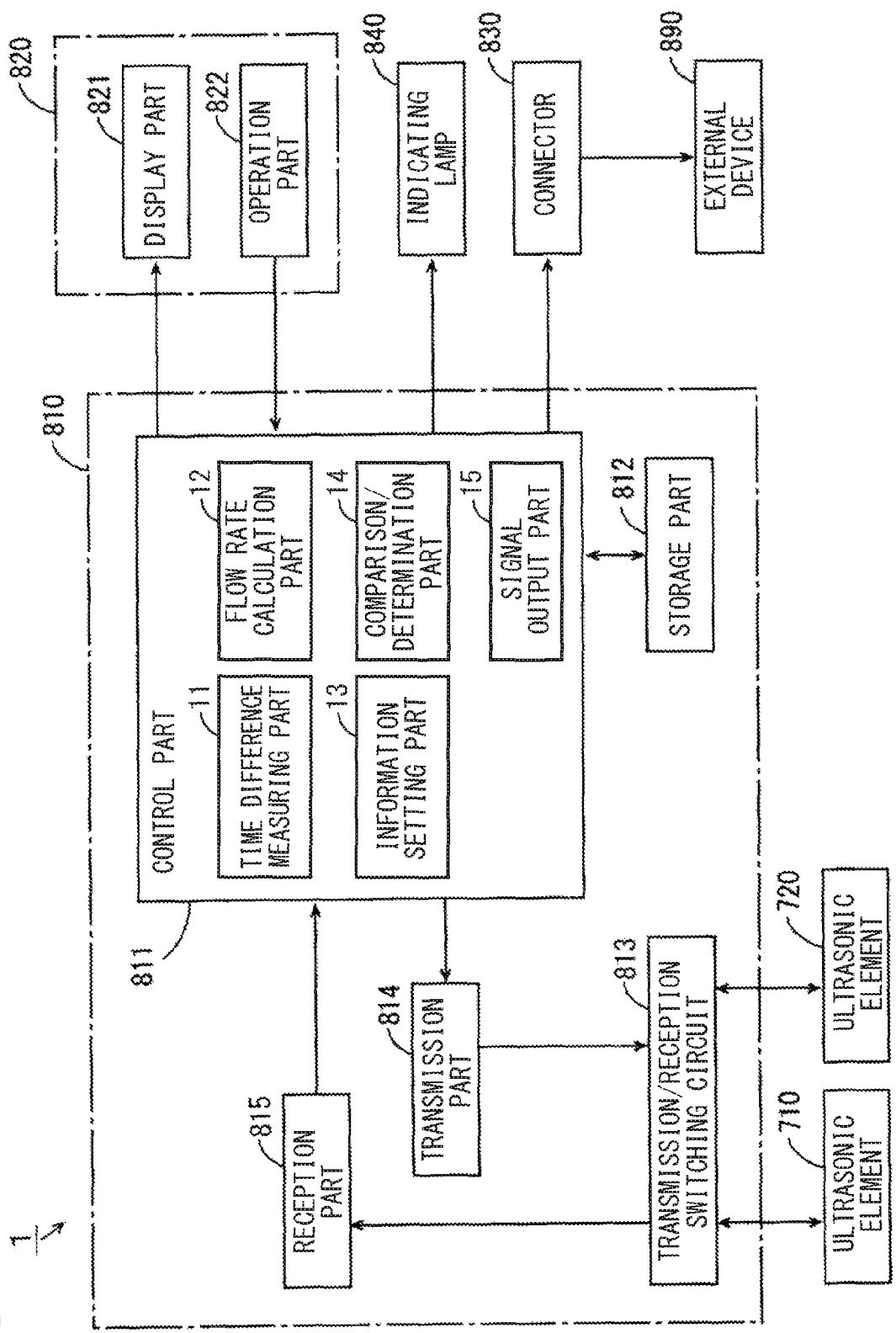
FIG. 3 is a block diagram showing a control system of the flow switch.

FIG. 3 is a block diagram showing a control system of the flow switch 1. As shown in FIG. 3, in the main substrate 810, a transmission/reception switching circuit 813, a transmission part 814, and a reception part 815 are provided in addition to the above-described control part 811 and storage part 812.

The transmission part 814 includes, for example, a signal generation circuit and an amplifier circuit. Moreover, the reception part 815 includes, for example, an A/D (Analog/Digital) conversion circuit, and an amplifier circuit. The transmission part 814 and the reception part 815 are connected to the transmission/reception switching circuit 813.

In the transmission part 814, an analog signal is generated from the signal generation circuit, based on control by the control part 811. The generated analog signal is given to the transmission/reception switching circuit 813 while being amplified by the amplifier circuit. The transmission/reception switching circuit 813 alternately gives the analog signal given from the transmission part 814 to the ultrasonic elements 710, 720. The analog signal is given to the ultrasonic element 710 to thereby generate an ultrasonic wave from the ultrasonic element 710. The analog signal is given to the ultrasonic element 720 to thereby generate an ultrasonic wave from the ultrasonic element 720.

As shown in FIG. 2, the ultrasonic wave generated from the ultrasonic element 710 enters a fluid in the pipe 2 at an incident angle θ through the channel member 530 and the acoustic couplant 610. The ultrasonic wave propagated in the fluid is reflected at an inner surface of the pipe 2 at a reflection angle θ. The reflected ultrasonic wave is received by the ultrasonic element 720 through the acoustic couplant 610 and the channel member 530. The ultrasonic element 720 outputs an analog signal based on the received ultrasonic wave. The analog signal outputted from the ultrasonic element 720 is given to the reception part 815 through the transmission/reception switching circuit 813 in FIG. 3.

In the reception part 815, the analog signal given from the transmission/reception switching circuit 813 is amplified by the amplifier circuit, and is converted to a digital signal by the A/D conversion circuit. The converted digital signal is given to the control part 811.

On the other hand, the ultrasonic wave generated from the ultrasonic element 720 enters the fluid in the pipe 2 at the incident angle θ through the channel member 530 and the acoustic couplant 610. The ultrasonic wave propagated in the fluid is reflected at the inner surface of the pipe 2 at the reflection angle θ. The reflected ultrasonic wave is received by the ultrasonic element 710 through the acoustic couplant 610 and the channel member 530. The ultrasonic element 710 outputs an analog signal based on the received ultrasonic wave. The analog signal outputted from the ultrasonic element 710 is given to the control part 811 while being amplified and converted to a digital signal through the transmission/reception switching circuit 813 and the reception part 815 in FIG. 3.

The control part 811 executes the program stored in the storage part 812, by which functions of a time difference measuring part 11, a flow rate calculation part 12, an information setting part 13, a comparison/determination part 14, and a signal output part 15 are implemented, as shown in FIG. 3.

The time difference measuring part 11 measures a time difference Δt, based on the digital signal given from the reception part 815. The time difference Δt is a difference between a time that it takes for the ultrasonic element 720 to receive the ultrasonic wave generated by the ultrasonic element 710, and a time that it takes for the ultrasonic element 710 to receive the ultrasonic wave generated by the ultrasonic element 720. The flow rate calculation part 12 calculates a velocity $V_f$ of the fluid flow in the pipe 2 by the following expression (1), and calculates a flow rate Q of the fluid flow in the pipe 2 by the following expression (2), based on the time difference Δt measured by the time difference measuring part 11.

[Expression 1]
$$V_f = \frac{V_s^2}{4d\tan\theta}\Delta t \quad (1)$$

[Expression 2]
$$Q = \frac{1}{K} \cdot \frac{\pi d V_s^2}{16\tan\theta}\Delta t \quad (2)$$

Here, d is an internal diameter of the pipe 2, θ is an incident angle of the ultrasonic wave, and $V_s$ is a velocity of the ultrasonic wave propagated in the fluid. K is a flow rate correction coefficient for converting the velocity of the fluid having predetermined distribution inside a cross section of the pipe 2 to an average velocity. As described later, the incident angle θ, the velocity $V_s$ and the flow rate correction coefficient K may be decided beforehand, or may be set as needed.

The information setting part 13 sets input information regarding at least one of the pipe 2 and the fluid in response to operation of the operation part 822 by a user. The input information is stored in the storage part 812. The setting of the input information will be described later. Moreover, the information setting part 13 causes the storage part 812 to store a threshold value of the flow rate in response to the operation of the operation part 822 by the user.

The comparison/determination part 14 compares the calculated flow rate Q with the threshold value beforehand stored in the storage part 812 to determine whether or not the flow rate Q is larger than the threshold value. The signal output part 15 outputs an on/off signal based on the determination result by the comparison/determination part 14 to an external device 890 through the connector 830 and the cable 3.

The on/off signal is, for example, a digital signal, and if the flow rate Q is larger than the threshold value, the on/off signal at a high level (or a low level) is outputted, while if the flow rate Q is the threshold value or smaller, the on/off signal at the low level (or the high level) is outputted. Moreover, threshold values equivalent to an upper limit value and a lower limit value of a range of the permissible flow rate Q may be set. In this case, if the flow rate Q is not larger than the upper limit value and not smaller than the lower limit value, the on/off signal at the high level (or the low level) is outputted, and if the flow rate Q is larger than the upper limit value or smaller than the lower limit value, the on/off signal at the low level (or the high level) is outputted.

In the display part 821 are displayed various types of information such as the velocity $V_f$ of the fluid calculated by the above-described expression (1), the flow rate Q calculated by the above-described expression (2) or the threshold value stored in the storage part 812, and the like.

The indicating lamp 840 is lighted so that the determination result by the comparison/determination part 14 can be identified. For example, the indicating lamp 840 is lighted (or put off) if the flow rate Q is larger than the threshold value, and is put off (or lighted) if the flow rate Q is not larger than the threshold value. This enables the user to identify whether or not the flow rate Q is larger than the threshold value. The indicating lamp 840 may include an LED that emits green light and an LED that emits red light. In this case, the indicating lamp 840 may be lighted in green (or in red) if the flow rate Q is larger than the threshold value, and may be lighted in red (or in green) if the flow rate Q is not larger than the threshold value.

[2] Flow Rate Display and Setting of Threshold Value

Figure 4:
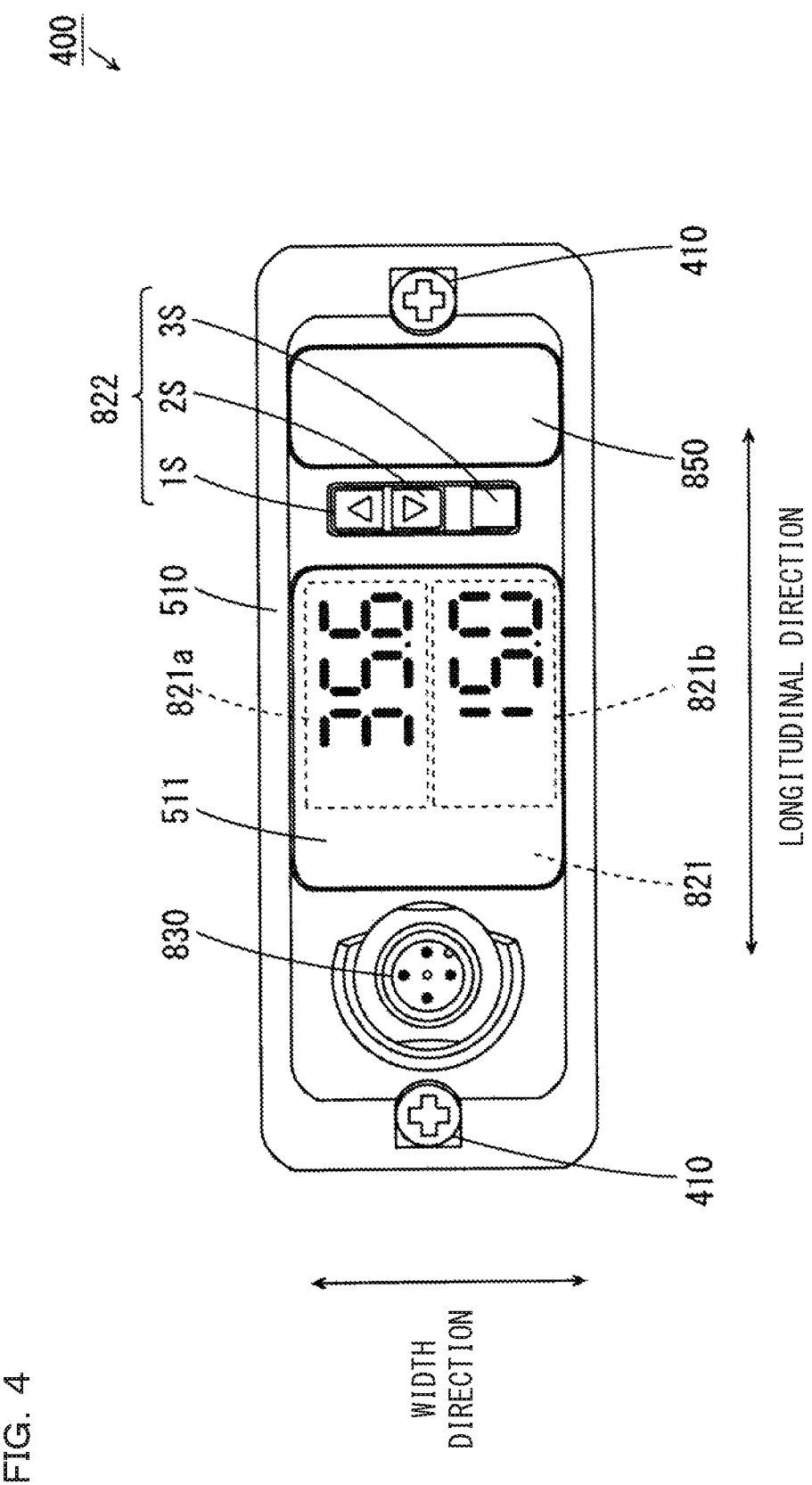
FIG. 4 is a plan view of a sensor part.

FIG. 4 is a plan view of the sensor part 400. As shown in FIG. 4, the user can visually check the information displayed in the display part 821 in FIG. 2 through the window part 511 provided in a center of an upper surface of the sensor part 400. The display part 821 has display regions in two stages disposed side by side in a width direction of the sensor part 400. In the display region in each of the stages, four characters can be displayed. In the following description, one of the display regions in the two stages is referred to as an upper-stage display region 821a, and the other display region is referred to as a lower-stage display region 821b.

In the upper-stage display region 821a, for example, the current flow rate Q calculated by the flow rate calculation part 12 in FIG. 3 is shown. Moreover, in the lower-state display region 821b, for example, the threshold value set beforehand is shown. In FIG. 4, an example is shown, in which the current flow rate Q is 35.6 (L/min), and the threshold value is 15.0 (L/min).

In a longitudinal direction of the sensor part 400, the operation part 822 is provided adjacent to the window part 511. The operation part 822 includes an upper button 1S, a lower button 2S, and a mode button 3S. The upper button 1S, the lower button 2S, and the mode button 3S are each configured so as be able to be pressed and operated by the user. The user can set various types of information by operating the upper button 1S, the lower button 2S, and the mode button 3S.

For example, the user presses and operates the upper button 1S in a state where the current flow rate Q and the threshold value are displayed in the upper-stage display region 821a and the lower-stage display region 821b, respectively. In this case, the threshold value stored in the storage part 812 in FIG. 3 is updated to a larger value, and the updated threshold value is displayed in the lower-stage display region 821b. On the other hand, when the user presses and operates the lower button 2S, the threshold value stored in the storage part 812 is updated to a smaller value, and the updated threshold value is displayed in the lower-stage display region 821b.

[3] Setting of Input Information

In the present embodiment, as setting modes of the input information, there are a simple setting mode and a detailed setting mode, and the input information is set at least by the simple setting mode. Hereinafter, the simple setting mode and the detailed setting mode will be described specifically.

[3-1] Simple Setting Mode

In the simple setting mode, only information regarding a dimension of the pipe 2 (hereinafter, referred to as pipe information) is set. The pipe information is only an outer diameter of the pipe 2, only a thickness of the pipe 2, or both the diameter of the pipe 2 and the thickness of the pipe 2.

In order to calculate the flow rate of the fluid in the pipe 2, the inner diameter of the pipe 2 is required, as represented by the Expressions (1) and (2). On the other hand, as general dimensions of the pipe 2, a plurality of types are decided by a standard. Thus, when at least one of the outer diameter and the thickness of the pipe 2 is specified, the inner diameter of the pipe 2 is specified, based on the standard.

Moreover, the incident angle θ, the velocity $V_s$, and the flow rate correction coefficient K of the expression 2 vary, depending on various parameters regarding characteristics of the pipe 2 and the fluid, such as a material of the pipe 2, a sonic speed in the fluid, a temperature, a density, and a kinetic viscosity of the fluid, and the like. The characteristics of the pipe 2 depend on the material of the pipe 2, and the characteristics of the fluid depend on a kind of the fluid.

The pipe 2 and the fluid as objects of the use of the flow switch 1 are almost constant. For example, the material of the pipe as the object is carbon steel, and the fluid as the object is pure water. Consequently, the characteristics of the pipe 2 and the fluid as the objects are specified beforehand. The incident angle θ, the velocity $V_s$, and the flow rate correction coefficient K corresponding to the characteristics of the relevant pipe 2 and fluid are beforehand stored in the storage part 812 in FIG. 3 as initial information.

When the pipe information is set in the simple setting mode, the flow rate of the fluid can be calculated, based on the relevant pipe information and the initial information beforehand stored. In the case where both of the outer diameter and the thickness of the pipe 2 are set, calculation accuracy of the flow rate of the fluid is increased, as compared with in the case where only the outer diameter of the pipe 2 or only the thickness of the pipe 2 is set.

Figure 5A:
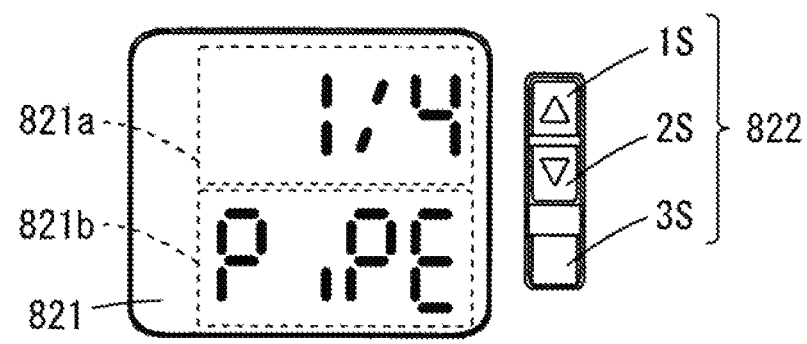
FIGS. 5A and 5B are views showing examples of a setting screen for pipe information.
Figure 5B:
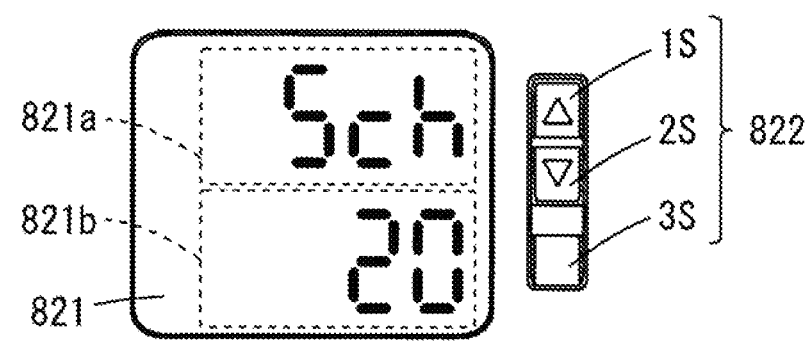

FIGS. 5A and 5B are views showing examples of a setting screen for the pipe information. The example in FIG. 5A is a setting screen for the outer diameter of the pipe 2, in which a nominal diameter of the pipe 2 is displayed in the upper-stage display region 821a. The nominal diameter is represented by A denomination in millimeters or by B denomination in inches, and is generally used to specify the outer diameter of the pipe 2. In the example in FIG. 5A, the nominal diameter is represented by the B denomination. The nominal diameter is specified by a JIS standard or the like. The outer diameter of the pipe 2 may be represented by the nominal diameter of the A denomination, and may be represented by a numerical value in millimeters or in inches indicating an actual dimension. A numerical value in millimeters or in inches as the nominal diameter (the A denomination or the B denomination) does not coincide with the numerical value in millimeters or in inches indicating the actual dimension.

In the example in FIG. 5B is a setting screen for the thickness of the pipe 2, in which a schedule number indicating the thickness of the pipe 2 is displayed in the lower-stage display region 821b. The schedule number is specified by the JIS standard or the like. The thickness of the pipe 2 may be represented by a numerical number in millimeters or in inches indicating an actual dimension, or the like In the case where the pipe information is only the outer diameter of the pipe 2, for example, the pipe information is set on the setting screen in FIG. 5A. In the case where the pipe information is only the thickness of the pipe 2, for example, the pipe information is set on the setting screen in FIG. 5B. Moreover, in the case where the pipe information is both the outer diameter and the thickness of the pipe 2, for example, the setting screens in FIG. 5A and FIG. 5B are sequentially displayed to set the pipe information on these setting screens.

As the outer diameter of the pipe 2, the thickness of the pipe 2, or the outer diameter and the thickness of the pipe 2, a plurality of conditions may be beforehand stored in the storage part 812 in FIG. 3, and one of the plurality of the conditions may be selected to thereby set the pipe information. For example, in the example in FIG. 5A, the upper button 1S and the lower button 2S are pressed to sequentially display the plurality of outer diameters (nominal diameters) stored beforehand, and the mode button 3S is pressed to thereby set the outer diameter displayed at that time as the pipe information. Moreover, in the example in FIG. 5B, the upper button 1S and the lower button 2S are pressed to sequentially display the plurality of thicknesses (schedule numbers) stored beforehand, and the mode button 3S is pressed to thereby set the thickness displayed at that time as the pipe information. Moreover, a number or a title may be given to each of the plurality of conditions regarding the outer diameter or the thickness of the pipe 2, and one of the numbers or the titles may be selected to thereby set the pipe information. Alternatively, a numerical value or the like indicating the diameter or the thickness of the pipe 2 may be directly inputted to thereby set the pipe information.

[3-2] Detailed Setting Mode

In the detailed setting mode, information regarding the pipe 2 and the fluid other than the above-described pipe information is set as detailed information. The detailed information includes, for example, the material of the pipe 2 or the kind of the fluid. Moreover, the detailed information may include the sonic speed in the fluid, the temperature, the density, and the kinetic viscosity of the fluid, and so on. In this case, even if the actual material of the pipe 2 is different from the material of the pipe 2 corresponding to the initial information, or even if the actual kind of the fluid is different from the kind of the fluid corresponding to the initial information, the flow rate of the fluid can be calculated accurately, based on the detailed information. Accordingly, the flow switch 1 can be used in diverse situations.

Figure 6A:
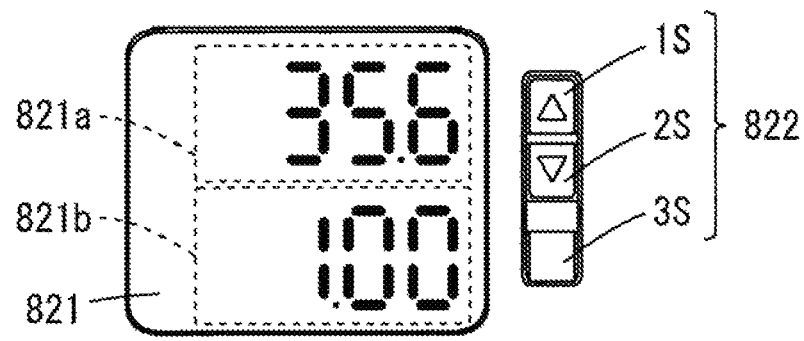
FIGS. 6A to 6C are views showing examples of a setting screen for adjustment information.
Figure 6B:
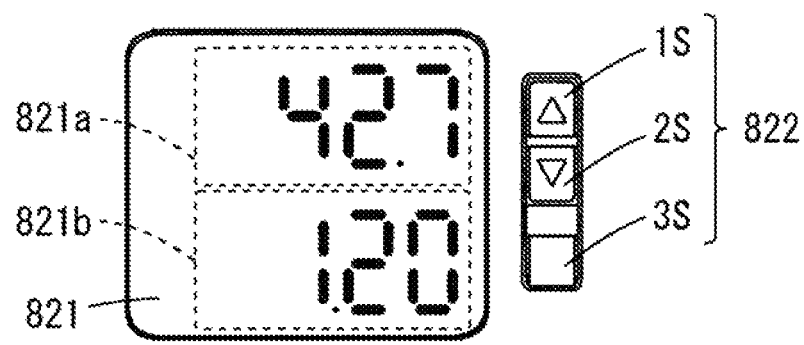
Figure 6C:
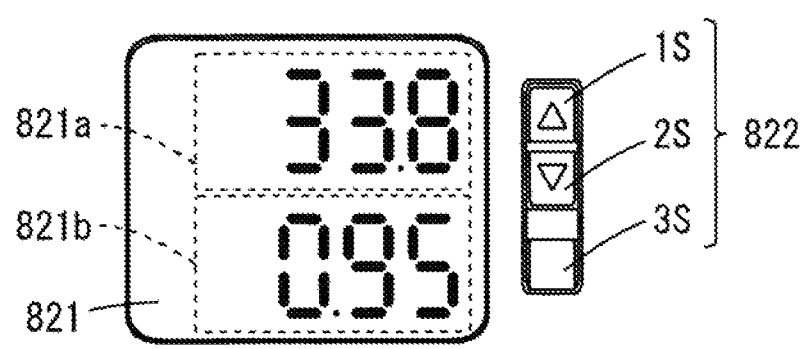

Moreover, the detailed information may include adjustment information for adjusting the flow rate calculated by the flow rate calculation part 12 in FIG. 3. Hereinafter, the flow rate before being adjusted by the adjustment information is referred to as a basic flow rate, and the flow rate after being adjusted by the adjustment information is referred to as a corrected flow rate. FIGS. 6A, 6B, 6C are views showing examples of a setting screen for the adjustment information. In each of the examples in FIGS. 6A, 6B, 6C, an adjustment ratio is displayed as the adjustment information in the lower-stage display region 821*b*. The adjustment ratio is a ratio of the corrected flow rate to the basic flow rate. In the upper-stage display region 821*a*, the corrected flow rate is displayed.

In the example in FIG. 6A, the adjustment ratio is 1.0, so that the corrected flow rate is equal to the basic flow rate. For example, the upper button 1S or the lower button 2S is pressed to thereby change the adjustment ratio. In the example in FIG. 6B, the adjustment ratio is 1.2. Accordingly, the displayed corrected flow rate exhibits a value obtained by multiplying the basic flow rate by 1.2. Moreover, in the example in FIG. 6C, the adjustment ratio is 0.95. Accordingly, the displayed corrected flow rate exhibits a value obtained by multiplying the basic flow rate by 0.95. In this manner, when the flow rate adjustment value displayed in the lower-stage display region 821*b* is changed, the corrected flow rate displayed in the upper-stage display region 821*a* is updated as needed. This enables the user to perform the setting operation of the flow rate adjustment value easily and properly while checking the corrected flow rate.

If the basic flow rate is different from the actual flow rate, setting of the adjustment information allows the calculated flow rate to be adjusted. For example, if the flow rate of the fluid in the pipe 2 is measured by another measurement device with high accuracy, and a measured value is different from the basic flow rate calculated by the flow switch 1, the adjustment information is set so that the corrected flow rate coincides with the measured value. The comparison/determination part 14 in FIG. 3 compares the corrected flow rate with a threshold value.

As a cause for which the basic flow rate is different from the actual flow rate, it can be considered that any parameter used for the calculation of the flow rate is erroneous. However, it is difficult to specify the erroneous parameter, and even though the parameter can be specified, complicated calculation and operation for correcting an error are required. Consequently, setting the adjustment information for adjusting the basic flow rate enables the error of the flow rate to be corrected by the simple operation as needed.

When the information regarding the plurality of setting items is set as the input information in at least one of the simple setting mode and the detailed setting mode, it is preferable that the plurality of setting screens corresponding to these setting items are sequentially displayed to accept the corresponding information on the respective setting screens. For example, in the simple setting mode, the outer diameter and the thickness of the pipe 2 are set as the pipe information, and in the detailed setting mode, the kind of the fluid and the adjustment information are set as the detailed information. In this case, the setting screen for the outer diameter of the pipe 2 (refer to FIG. 5A) and the setting screen for the thickness of the pipe 2 (refer to FIG. 5B) are sequentially displayed to sequentially accept the outer diameter and the thickness of the pipe 2. Subsequently, the setting screen for the kind of the fluid and the setting screen for the adjustment information (refer to FIGS. 6A, 6B, 6C) are sequentially displayed to sequentially accept the kind of the fluid and the adjustment information. In this manner, the plurality of pieces of information are accepted sequentially, which makes it unnecessary for the user to select the setting items or the like. Accordingly, the user can easily perform the operation for the settings while viewing the setting screens displayed sequentially.

[4] Input Information Setting Processing

Figure 7:
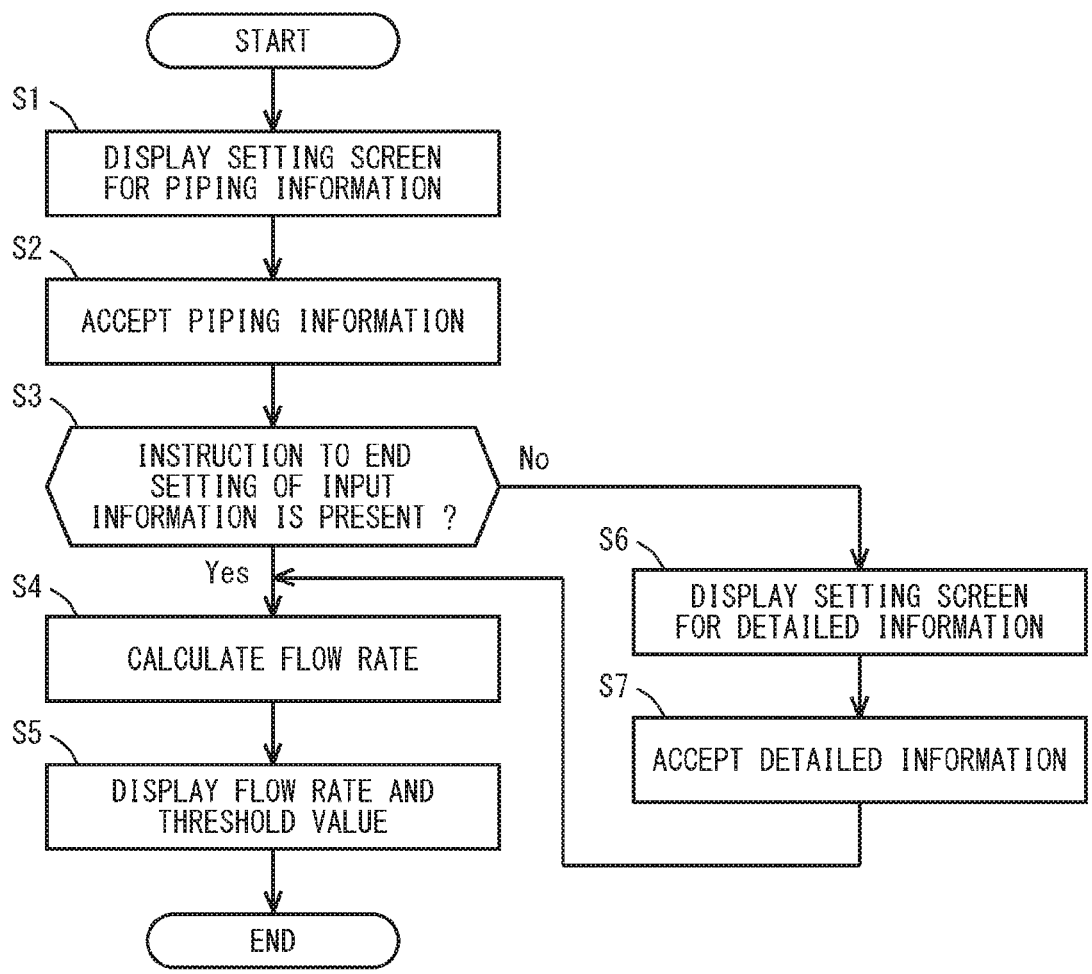
FIG. 7 is a flowchart showing one example of input information setting processing.

The control part 811 in FIG. 3 performs input information setting processing, based on a control program stored in the storage part 812 beforehand. FIG. 7 is a flowchart showing one example of the input information setting processing. The input information setting processing in FIG. 7 is started, for example, at the time of first power supply after shipping from a factory, or at the time of execution of predetermined operation to initialize the setting.

As shown in FIG. 7, the information setting part 13 first causes the display part 821 to display the setting screen for the pipe information (refer to FIGS. 5A and 5B) as the simple setting mode (step S1). Next, the information setting part 13 accepts the pipe information, based on the operation of the operation part 822 by the user (step S2). For example, the upper button 1S and the lower button 2S in FIGS. 5A and 5B are pressed to thereby select the numerical value or the like for the outer diameter or the thickness of the pipe 2, or for both of them, and in this state, the mode button 3S is pressed to thereby accept the pipe information.

Next, the information setting part 13 determines whether or not an instruction to end the setting of the input information is present (step S3). For example, if the mode button 3S in FIGS. 5A, 5B is pressed only for a short time at the time of acceptance of the pipe information in step S2, the end of the setting of the input information is instructed. On the other hand, if the mode button 3S in FIGS. 5A, 5B is pressed for a long time at the time of acceptance of the pipe information in step S2, switching to the detailed setting mode is instructed.

If the instruction to end the setting of the input information is present, the flow rate calculation part 12 calculates the flow rate of the fluid in the pipe 2, based on the pipe information accepted in step S2 (step S4). For the calculation of the flow rate, the inner diameter of the pipe 2 specified by the pipe information, the time difference Δt measured by the time difference measuring part 11 in FIG. 3, and the like are used. Next, the information setting part 13 causes the display part 821 to display the calculated flow rate and the threshold value stored beforehand (step S5). This ends the input information setting processing.

On the other hand, in step S3, if an instruction to switch to the detailed setting mode is present without the instruction to end the setting of the input information, the information setting part 13 causes the display part 821 to display the setting screen for the detailed information (refer to FIGS. 6A, 6B, 6C). Next, the information setting part 13 accepts the detailed information, based on the operation of the operation part 822 by the user. This allows the material of the pipe, the kind of the fluid, the adjustment information or the like to be set as the detailed information.

Thereafter, the flow rate calculation part 12 calculates the flow rate of the fluid in the pipe 2, based on the accepted pipe information and detailed information. In this case, at least the inner diameter of the pipe 2 specified by the pipe information, the other parameters specified by the detailed information, the time difference Δt measured by the time difference measuring part 11, and the like are used. Next, the information setting part 13 causes the display part 821 to display the calculated flow rate and the threshold value stored beforehand (step S5). This ends the input information setting processing.

[5] Effects

In the flow switch 1 according to the present embodiment, when the input information is set in the simple setting mode, only the outer diameter of the pipe 2, only the thickness of the pipe 2, or both the outer diameter and the thickness of the pipe 2 are accepted. The flow rate of the fluid in the pipe 2 is calculated, based on the accepted input information, and is displayed in the display part 821. In this case, other information regarding the pipe and the fluid is not requested to the user. This enables the user to use the flow switch 1 by the simple setting operation with no expert knowledge and complicated operation required.

[6] Other Embodiments (1) While in the above-described embodiment, the simple setting mode and the detailed setting mode are provided as the setting modes for setting the input information, the invention is not limited thereto. For example, in the case where the pipe 2 and the fluid as the objects are constant, the setting mode may be only the simple setting mode. In this case, the initial information corresponding to the characteristics of the pipe 2 and the fluid as the objects is stored beforehand, and the flow rate of the fluid in the pipe 2 can be appropriately calculated, based on the initial information and the pipe information set in the simple setting mode.

(2) While in the above-described embodiment, the signal output part 15 outputs only the one on/off signal, the invention is not limited thereto, but the signal output part 15 may output a plurality of on/off signals. For example, the calculated flow rate is compared with each of a plurality of thresholds, and based on comparison results, the plurality of on/off signals corresponding to the plurality of threshold values are outputted. In this case, diverse controls of the external device are enabled, based on the plurality of on/off signals.

(3) While in the above-described embodiment, the control part 811 of the sensor part 400 calculates the flow rate of the fluid flow in the pipe 2 by the Expression (2), based on a propagation time difference method, the invention is not limited thereto. The control part 811 may calculate the flow rate of the fluid flow in the pipe 2, based on a Doppler method. In this case, one of the ultrasonic elements 710, 720 may be made of an ultrasonic transmission element, and the other of the ultrasonic elements 710, 720 may be made of an ultrasonic reception element.

(4) While in the above-described embodiment, the ultrasonic elements 710, 720 are held integrally, the invention is not limited thereto, but the ultrasonic elements 710, 720 may be held separately. In this case, a housing part, an electronic circuit part and the like may be provided so as to correspond to each of the ultrasonic elements 710, 720.

(5) While in the above-described embodiment, the display part 821 is contained in the housing part 500, the invention is not limited thereto. The display part 821 may be provided separately outside the housing part 500. For example, the display part 821 may be provided at a position apart from the pipe 2 and the ultrasonic elements 710, 720.

(6) While in the above-described embodiment, the control part 811 and the storage part 812 are contained in the housing part 500 together with the main substrate 810, the invention is not limited thereto. The control part 811 and the storage part 812 may be provided outside the housing part 500. For example, the control part 811 and the storage part 812 may be provided at positions apart from the pipe 2 and the ultrasonic elements 710, 720.

(7) While in the above-described embodiment, each of the time difference measuring part 11, the flow rate calculation part 12, the information setting part 13, the comparison/determination part 14, and the signal output part 15 in FIG. 3 is implemented by hardware and software, the invention is not limited thereto. Each of the time difference measuring part 11, the flow rate calculation part 12, the information setting part 13, the comparison/determination part 14, and the signal output part 15 may be implemented by hardware such as an electronic circuit and the like, or a part of these components may be implemented by hardware and software such as a CPU, a memory, and the like.

(8) While in the above-described embodiment, the clamp part 100 that fixes the sensor part 400 is used to fix the ultrasonic elements 710, 720 to the pipe 2, the invention is not limited thereto. As long as the sensor part 400 can be fixed to the pipe 2, a clamping band may be used in place of the clamp part 100. Alternatively, a part of the clamp part 100 may be made of a clamping band.

[7] Correspondence Between Components in Claims and Elements in Embodiment

While hereinafter, examples of correspondence between components in claims and the elements in the embodiment will be described, the invention is not limited to the following examples.

In the above-described embodiment, the flow switch 1 is an example of an ultrasonic flow switch, the ultrasonic element 710 or the ultrasonic element 720 is an example of a first ultrasonic element, the ultrasonic element 720 or the ultrasonic element 710 is an example of a second ultrasonic element, and the clamp part 100, the housing part 500, the coupling part 600, the ultrasonic shielding plate 730, and the two filling members 740, 750 are an example of a fixture. Moreover, the information setting part 13 is an example of a reception interface, the flow rate calculation part 12 is an example of a calculation part, and the signal output part 15 is an example of an output part, and first and second output parts.

As the components in claims, other various elements having configurations or functions described in claims can be used.

The invention can be effectively used for various ultrasonic flow switches.

What is claimed is:

1. An ultrasonic flow switch to output an on/off signal based on a flow rate of a fluid flow in a pipe, the ultrasonic flow switch comprising:
   a first ultrasonic element configured to transmit an ultrasonic wave to a fluid flow in a pipe;
   a second ultrasonic element configured to receive the ultrasonic wave from the fluid flow in the pipe;
   a fixture detachably fixing the first and second ultrasonic elements to an outer surface of the pipe integrally or separately;
   a reception interface configured to receive input information regarding at least one of the pipe and the fluid;
   a calculation part configured to calculate the flow rate of the fluid in the pipe, based on an output signal of at least one of the first and second ultrasonic elements, and the input information received by the reception interface; and
   an output part configured to output the on/off signal, based on the flow rate calculated by the calculation part, and a preset flow rate threshold value,
   wherein the reception interface receives only an outer diameter of the pipe, only a thickness of the pipe, or both the outer diameter and the thickness of the pipe as the input information regarding the at least one of the pipe and the fluid in a first setting mode.

2. The ultrasonic flow switch according to claim 1, wherein the reception interface accepts, as the input information, one condition selected by a user from a plurality of conditions decided beforehand as the outer diameter of the pipe, the thickness of the pipe, or the outer diameter and the thickness of the pipe in the first mode.

3. The ultrasonic flow switch according to claim 1, wherein the reception interface accepts, as the input information, detailed information including a parameter regarding the pipe or the fluid other than the outer diameter and the thickness of the pipe in a second setting mode.

4. The ultrasonic flow switch according to claim 3, wherein the detailed information includes adjustment information for adjusting the flow rate calculated by the calculation part.

5. The ultrasonic flow switch according to claim 3, wherein the reception interface sequentially accepts a plurality of pieces of setting information corresponding to a plurality of setting items as the input information.

6. The ultrasonic flow switch according to claim 5, wherein the reception interface sequentially displays a plurality of setting screens corresponding to the plurality of setting items to accept the setting information on the setting screens.

7. The ultrasonic flow switch according to claim 1, wherein
   the output part includes first and second output parts,
   the threshold value includes first and second threshold values,
   the first output part outputs the on/off signal, based on the flow rate calculated by the calculation part and the first threshold value, and
   the second output part outputs the on/off signal, based on the flow rate calculated by the calculation part and the second threshold value.

8. The ultrasonic flow switch according to claim 1, wherein the second ultrasonic wave element is further configured to transmit an ultrasonic wave to the fluid in the pipe;
   the first ultrasonic wave element is further configured to receive the ultrasonic wave from the fluid in the pipe;
   a calculation part is configured to calculate the flow rate of the fluid in the pipe, based on an output signal of the first and second ultrasonic elements, and the input information received by the reception interface.

* * * * *